Feb. 17, 1931.   A. L. ALAJ   1,793,299
FOOD PROTECTING DEVICE
Filed Sept. 11, 1930

INVENTOR.
Antoine L. Alaj.
BY
Geo. P. Kimmel
ATTORNEY.

Patented Feb. 17, 1931

1,793,299

UNITED STATES PATENT OFFICE

ANTOINE L. ALAJ, OF CHICAGO, ILLINOIS, ASSIGNOR TO THE THERMO SERVICE CO. INC., A CORPORATION OF DELAWARE

FOOD-PROTECTING DEVICE

Application filed September 11, 1930. Serial No. 481,320.

This invention relates to a protecting device for food, more particularly to an improvement upon the form of protecting device as disclosed by Letters Patent 1,598,409, granted to me August 13, 1926, for enclosing an article of food upon a plate to prevent the dissipation of the heat or moisture thereof when transporting food from the kitchen to the place for serving, under such conditions maintaining the food in its substantially original prepared or cooked condition, and the invention as hereinafter set forth not only embodies the objects and advantages as referred to in the patent aforesaid, but has for its further object to provide, in a manner as hereinafter set forth, a new and novel combined supporting, sealing and cushioning means anchored to the bottom of the body portion of the device in a manner to prevent disconnection therefrom under ordinary conditions.

The food protecting device, in accordance with this invention is so constructed as to enable a series of such devices being arranged in superposed relation with respect to a series of spaced, superposed food carrying plates in a manner as disclosed in the patent aforesaid whereby the plates and devices can be transported, in stacked position, at one time by a waiter for serving a plurality of dinners with the food in its substantally originally cooked or prepared condition. Under such circumstances an expeditious service is provided whereby a great saving in time is had and delay to the diners is overcome. The device being so constructed that when serving one of the several diners, it is readily removed from the plate with which it is associated and supported upon the arm of a waiter.

Further objects of the invention are to provide, in a manner as hereinafter set forth, a food protecting device which is simple in its construcion and arrangement, strong, durable, compact, thoroughly efficient in its use, conveniently mounted with respect to the food carrying plate, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
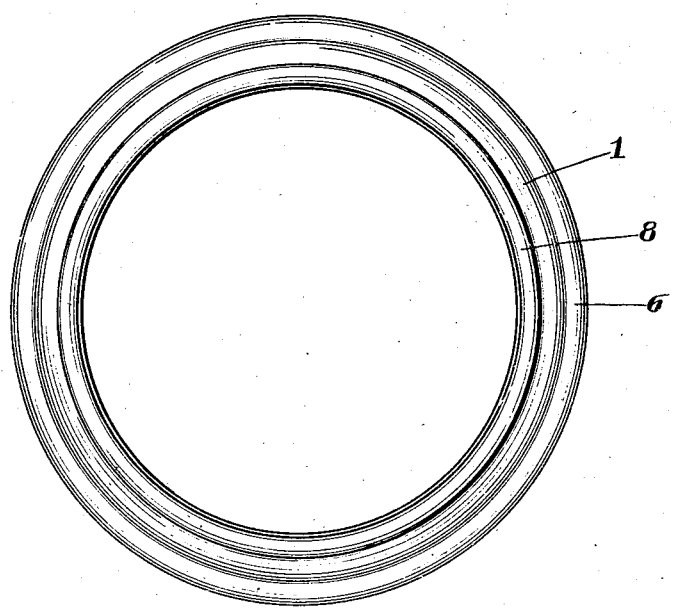
Figure 1 is a top plan view of a food protecting device in accordance with this invention.
Figure 2:
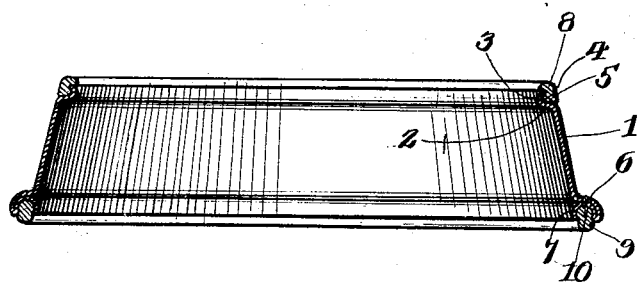
Figure 2 is a cross sectional view thereof.

A food protector device, in accordance with this invention, comprises a tapered body portion of band like form constructed of any suitable material, preferably metallic of any desired guage.

The body portion of the device is indicated at 1 and is formed at its top with an inwardly directed flange 2 which terminates in an upwardly directed projection 3 of curved contour in vertical section to provide an outwardly opening groove 4. The flange 2 provides a seat 5.

The bottom of the body portion 1 terminates in an outwardly directed, downwardly extending, arcuate flange 6 which merges into and overlaps an inverted, substantially semi-circular shaped holder 7 having its inner side in alignment with and extending from the lower end of and further flush with the inner periphery of the body portion 1 whereby said inner side of the holder will form a continuation and increase the height of the body portion. The holder 7 provides a groove 10. The transverse cross sectional contour of the holder 7 is such as to provide the groove 10 with a contracted mouth for a purpose to be referred to.

Mounted on the seat 5 and extending into the groove 4, as well as overlapping the top of the projection 3 is a resilient member 8. Mounted in the holder 7, as well as depending therefrom is a combined sealing, cushioning and supporting member 9. The edges at the mouth of the holder 7 bite into the member 9 to compress the same between its upper and lower edges whereby the member 9 is secured with the body portion. The members 8 and 9 conform in contour to the body portion 1. The outer edge of the member 8 is flush with the outer periphery of the body portion 1 and the inner edge of the member 9 is substantially flush with the outer periphery of the body portion 1.

The groove 4 opens at right angles to the groove 10 which is provided by the holder 7. The thickness of the member 9 is greater than the width of the mouth of the groove 10 whereby the resilient characteristic of the member 9 provides for a clamping action therebetween and the edges of said holder 7 as such edges extend into the opposite sides of the member 9 to secure the latter in position.

The members 8 and 9 are co-extensive with the edges of the body portion. The member 8 provides a support for a food carrying plate and further a seal for the top of the body portion 1 when the said plate is mounted in position on member 8. The member 9 provides a depending support and cushion for the bottom of the body portion 1, as well as a seal for said bottom when the said body portion 1 is mounted on a food carrying plate and with the body portion 1 encompassing the food.

When the protecting device is employed, the member 9 is mounted upon the plate provided with the food and the member 8 is to abut against the bottom of a food carrying plate arranged in superposed spaced relation with respect to that plate upon which seats the member 9 and by this arrangement the article of food carried by the lower plate is enclosed and the device acts to prevent the dissipation of heat of moisture when transporting the food from the kitchen to the place of serving, under such conditions the food is substantially in its originally prepared or cooked condition, therefore it is thought that the many advantages of a food protecting device, in accordance with this invention, can be readily understood, and although the preferred embodiment of the invention is as illustrated and described, yet it is to be understood that changes in the details of construction can be had which will fall within the scope of the invention as claimed.

What I claim is:

1. A food protecting device comprising a tapered body portion of band like form having extended outwardly from its lower edge a laterally and downwardly disposed curved flange depending below said edge, said flange merging at its outer terminus into and bearing on an upstanding, inverted, curved, open bottom holder of a contour greater than a half circle, said holder having its outer side and a portion of its top abutting the inner face of the downwardly extending part and a portion of the inner face of the top of said flange and having its inner side spaced from said lower edge and forming a downward continuation of said body to increase the height of the latter, said holder providing a downwardly opening groove, a resilient sealing member snugly fitting the walls of and depending from the mouth of the groove, and said holder providing a contracted mouth for the groove whereby the opposed edges of the holder will retain under a state of compression, an intermediate part of each side of the sealing member to clamp the latter in position.

2. A food protecting device comprising a body portion of band like form having extended outwardly from its lower edge a laterally and downwardly disposed flange having its outer part depending below said lower edge, said flange having its outer terminus merging into an inverted, upstanding, curved, open bottom holder, said flange bearing against and enclosing said holder, said holder having its outer part abutting the inner face of the outer part of the flange and the top of its inner part spaced from said lower edge, the inner part of said holder aligning with and forming a downward continuation of said body portion to increase the height of the latter, said holder forming a downwardly opening groove having a contracted mouth, and a resilient sealing member snugly fitting the walls of and depending from the mouth of the groove, the contracted mouth of the groove providing for the edges of the holder below said lower edge holding under a state of compression an intermediate part of each side of the sealing member to clamp the latter with said body portion exteriorly of the latter.

3. A food protecting device comprising a body portion of band like form having extended outwardly from its lower edge a laterally and downwardly disposed flange having its outer part depending below said lower edge, said flange having its outer terminus merging into an inverted, upstanding, curved, open bottom holder, said flange bearing against and enclosing said holder, said holder having its outer part abutting the inner face of the outer part of the flange and the top of its inner part spaced from said lower edge, the inner part of said holder aligning with and forming a downward continuation of said body portion to increase the height of the latter, said holder forming a downwardly opening groove having a contracted mouth, a resilient sealing member snugly fitting the walls of and depending from the mouth of the groove, the contracted mouth of the groove providing for the edges of the holder below said lower edge holding under a state of compression an intermediate part of each side of the sealing member to clamp the latter with said body portion exteriorly of the latter, and said sealing member being of oval contour in cross section.

In testimony whereof, I affix my signature hereto.

ANTOINE L. ALAJ.